United States Patent Office 3,285,893
Patented Nov. 15, 1966

3,285,893
CROSS LINKED ELASTOMERIC FIBERS FROM COPOLYMERS OF EPIHALOHYDRINS AND ETHYLENICALLY UNSATURATED MONO-EPOXIDES
Edwin J. Vandenberg, Wilmington, Del., assignor to Hercules Incorporated, a corporation of Delaware
No Drawing. Filed Sept. 17, 1964, Ser. No. 397,326
9 Claims. (Cl. 260—88.3)

This application is a continuation-in-part of my application U.S. Serial No. 4,594, filed January 26, 1960, now U.S. 3,158,591, which is in turn a continuation-in-part of my application U.S. Serial No. 738,627, filed May 29, 1958, now abandoned, and of my application U.S. Serial No. 812,079, filed May 11, 1959, now U.S. 3,135,705 issued June 2, 1964, which is in turn a continuation-in-part of my application U.S. Serial No. 738,626, filed May 29, 1958, now abandoned.

This invention relates to new elastomeric fibers, and more particularly to elastomeric fibers derived from the vulcanizates of copolymers of epihalohydrins with ethylenically unsaturated epoxides.

In accordance with this invention, it has been discovered that elastomeric fibers can be obtained by spinning a vulcanizable composition containing a copolymer of an epihalohydrin and an ethylenically unsaturated epoxide and then curing the spun fiber. The copolymers utilized are unique in that they are essentially linear polyethers, copolymerization having taken place through the epoxy groups. Hence, they provide two types of loci for cross-linking reactions, the halogen atoms in the epihalohydrin portions of the polymer and the ethylene double bonds in the ethylenically unsaturated epoxide portion of the polymer. As a result, it is possible to compound them with standard sulfur recipes to produce compositions which can be spun and then vulcanized to yield excellent elastomeric fibers with superior solvent resistance and stability characteristics. Such fibers can also be prepared in fine deniers and are thus more useful than conventional cut rubber threads.

The copolymers which are spun and vulcanized into fibers in accordance with this invention are those produced by the copolymerization of an epihalohydrin with at least one other epoxide, at least one of which contains, in addition to the oxirane ring, an ethylenically unsaturated group. Exemplary of the ethylenically unsaturated epoxides that can be copolymerized with the epihalohydrins to produce the copolymers used in this invention are unsaturated glycidyl ethers, monoepoxides of dienes or polyenes, glycidyl esters, etc. The unsaturated glycidyl ethers that can be copolymerized with the epihalohydrins have the general formula.

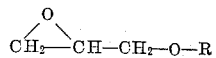

where R is an ethylenically unsaturated radical, as for example, ethylenically unsaturated aliphatic radicals such as vinyl, isopropenyl, allyl, methallyl, butenyl, oleyl, etc., and cycloalkyl or aryl radicals containing an ethylenically unsaturated substituent and cycloalkyl radicals containing an ethylenic double bond in the ring, as for example, 4-vinylcyclohexyl, α-terpinyl, γ-terpinyl, abietyl, cyclohexenylmethyl, o-allylphenyl, p-vinylbenzyl, etc. Exemplary of these ethers are vinyl glycidyl ether, allyl glycidyl ether, vinylcyclohexyl glycidyl ether, o-allylphenyl glycidyl ether, etc.

The monoepoxides of dienes and polyenes that can be copolymerized with epihalohydrins to produce the copolymers used in this invention have the general formula

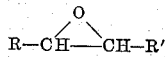

where R is an ethylenically unsaturated radical as defined above and R′ is hydrogen, R, alkyl, cycloalkyl, aryl or alkaryl or R and R′ together with the two carbons of the epoxy group may form a cycloaliphatic ring, e.g.

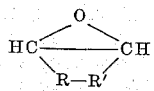

which may itself contain an ethylene double bond or which may be substituted by an ethylenically unsaturated hydrocarbon group such as a vinyl group. Exemplary of the monoepoxides of dienes and polyenes having the above general formula are butadiene monoxide, chloroprene monoxide, 3,4-epoxy-1-pentene, 4,5-epoxy-2-pentene, 4,5-epoxy-1-hexene, 5,6-epoxy-1-hexene, 5,6-epoxy-2-hexene, 3,4-epoxy-1-vinylcyclohexene, 1,2-epoxy-5-cyclooctene, 1,2-epoxy-5,9-cyclododecadiene, divinylbenzene monoxide, 5,6-epoxy-1,7-octadiene, etc.

Another class of the ethylenically unsaturated epoxides that can be copolymerized with epihalohydrins to produce the copolymers used in this invention are the glycidyl esters of ethylenically unsaturated carboxylic acids which have the general formula

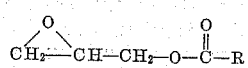

where R is an ethylenically unsaturated radical. Exemplary of such glycidyl esters are glycidyl acrylate, glycidyl methacrylate, glycidyl crotonate, glycidyl 2,4-dimethyl pentenoate, glycidyl 4-hexenoate, glycidyl 4-heptenoate, glycidyl 5-methyl-4-heptenoate, glycidyl sorbate, glycidyl linoleate, glycidyl oleate, glycidyl 3-butenoate, glycidyl 3-pentenoate, glycidyl 4-methyl-3-pentenoate, glycidyl abietate, the glycidyl ester of 3-cyclohexene carboxylic acid, the glycidyl ester of 4-methyl-3-cyclohexene carboxylic acid, etc.

Any epihalohydrin, as for example, epichlorohydrin, epibromohydrin, epifluorohydrin, or mixtures thereof, can be copolymerized with the ethylenically unsaturated epoxides to produce the polymers used in this invention. In addition, other epoxides can also be incorporated in these copolymerizations so that the final copolymer can be a terpolymer, a quaternary polymer, etc. Thus, the copolymers can include, in addition to the epihalohydrin monomer units and the ethylenically unsaturated epoxide monomer units, other epoxide monomer units, such as those of ethylene oxide, propylene oxide, butene-1 oxide, butene-2 oxides, dodecene-1 oxide, octadecene-1 oxide, cyclohexene oxides, styrene oxide, alkyl glycidyl ethers such as methyl glycidyl ether, phenyl glycidyl ethers, etc.

The copolymers utilized in this invention will then contain at least the following two repeating units

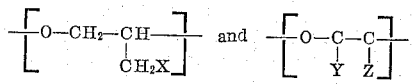

where X is halogen and Y is H, alkyl, aryl or cycloalkyl when Z is —R, —CH$_2$—O—R, or

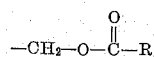

or Y and Z may both be R, or Y and Z together with the carbons to which they are attached may be a cycloaliphatic nucleus which itself contains an ethylene double bond or is in turn substituted with a group R, e.g.

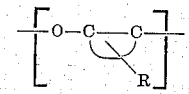

where R in each case is an ethylenically unsaturated radical such as vinyl, isopropenyl, allyl, methallyl, butenyl, oleyl, vinylcyclohexyl, α-terpinyl, abietyl, vinylphenyl, vinylbenzyl, alkylphenyl, etc.

These copolymers will contain from about 99.5% to about 20% of epihalohydrin and at least about 0.5% of the ethylenically unsaturated epoxide monomer and preferably will contain from about 98% to about 30% of the epihalohydrin and at least about 2% of the ethylenically unsaturated epoxide. Where one or more other epoxide monomers are present, these copolymers will contain at least about 20% and preferably about 30% of epihalohydrin and at least about 0.5% and preferably about 2% of the ethylenically unsaturated epoxide, so that in such terpolymers (or tetrapolymers, etc.) the unique properties of vulcanizability, etc., due to the presence of these monomers will not be lost. The amount will, of course, depend somewhat upon the additional epoxide monomers incorporated. Thus, when ethylene oxide or methyl glycidyl ether is copolymerized with the epihalohydrin and the ethylenically unsaturated epoxide, in an amount up to about 50% of the total monomers, the co-polymer will be essentially water insoluble, and little swollen by water, whereas in an amount above about 50%, the copolymer will, before vulcanization, be either at least partially water soluble or swollen by water. For example, with an ethylene oxide or methyl glycidyl ether content of 60–80%, the terpolymer, after vulcanization, exhibits some swelling in water, which is desirable in some fiber applications where moisture vapor transmission is desired, as in various articles of wearing apparel, and for this reason fibers prepared from these terpolymers are of outstanding value.

The polymeric epoxides or polyethers containing both halogen and ethylenic unsaturation used in this invention can be prepared by contacting a mixture of an epihalohydrin and epoxide-containing ethylenic unsaturation with an organoaluminum compound. Organoaluminum compounds that may be used to catalyze the polymerization are trialkylaluminum compounds, dialkylaluminum halides, monoalkylaluminum dihalides, dialkylaluminum hydrides, dialkylaluminum monoalkoxides and the corresponding cycloalkyl and aryl compounds. These organoaluminum compounds may be reacted with a chelating agent such as acetylacetone, trifluoroacetylacetone, etc., if desired. An effective catalyst may also be produced by reacting these organoaluminum compounds, including the chelated complexes, with from about 0.1 to about 1.5 moles of water and preferably 0.5 to 1 mole of water per mole of the organoaluminum compound.

The polymerization reaction is generally carried out in the presence of an inert, liquid, organic diluent but may be carried out in an essentially bulk polymerization process. Suitable diluents that may be used for the polymerization are the ethers such as diethyl ether, dipropyl ether, dibutyl ether, etc., halogenated hydrocarbons such as chlorobenzene, methylene chloride, etc., or a hydrocarbon diluent such as n-heptane, cyclohexane, benzene, toluene, etc. The temperature of the polymerization process may be varied over a wide range, generally from about −80° C. to about 250° C., and while atmospheric or autogenous pressure is usually used, the pressure may be varied from subatmospheric up to several atmospheres, if desired.

The new elastomeric fibers of this invention are prepared from the above-described copolymers of epihalohydrins and ethylenically unsaturated epoxides which are largely amorphous in character and which have a reduced specific viscosity of at least about 0.5 and preferably at least about 1.0 as measured on a 0.1% solution in α-chloronaphthalene at 100° C. or of at least about 0.7 and preferably at least about 1.4 when measured on a 0.1% solution in cyclohexanone at 50° C. In general, the solid, essentially wholly amorphous copolymers are preferred for the preparation of the elastomeric fibers of this invention. In some cases, the fiber will have better strength characteristics if the copolymer exhibits some degree of crystallinity, particularly on stretching, and will then be preferred, provided that the elastomeric properties and recovery characteristics are not adversely influenced. The amount of crystallinity that generally can be tolerated, without serious interference with rubbery properties, is an amount less than about 25%, as measured by X-ray diffraction methods, in the unstretched state and preferably will be below about 15%. Higher crystallinity may, of course, appear on stretching and this is desirable.

The elastomeric fibers are prepared by compounding the copolymer of epihalohydrin and ethylenically unsaturated epoxide with a suitable vulcanization system, spinning a fiber from the composition, and then curing (vulcanizing) the fiber. Since the copolymer is a polyether having repeating units that contain ethylenic unsaturation, it can be vulcanized by any conventional sulfur-curing system, that is, sulfur plus an accelerator such as a thiazole, thiuram, sulfenamide, dithiocarbamate, etc. There are many advantages in using a sulfur-curing system in the preparation of these elastomeric fibers. Sulfur-curing systems have curing rates that can be widely varied and controlled to suit operating conditions, they are well recognized as being non-toxic and free of dermatitis problems and they do not liberate corrosive hydrogen halides as a by-product. However, small amounts of other curatives which react with the halogen content of these copolymers, as for example, diamines such as ethylene diamine, hexamethylene diamine, hexamethylene diamine carbamate, etc., ethylene thiourea, urea, ammonium salts such as ammonium benzoate, etc., can also be used to obtain a faster initial cure or other desirable effects. A particularly effective and rapid curing system is zinc oxide, thiourea, tetramethyl thiuram disulfide, mercaptobenzothiazole and sulfur. Other well known accelerators can be substituted in this formula and the sulfur can be replaced with thiuram tetrasulfide such as bis pentamethylene thiuram tetrasulfide.

To obtain the highest tensile strengths in the final fiber, it is generally desirable to include a reinforcing filler in the elastomeric fiber formulation. Preferably, a reinforcing mineral filler such as silica is used, but any of the other well known reinforcing fillers can be used, as for example, aluminas, aluminum silicates, clays, titanium dioxide, carbon black, etc. Such fillers will generally be used in the amount of from about 5 to about 50 parts per hundred parts of copolymer, and preferably will be 8 to 30 parts per 100 parts of copolymer. The reinforcing filler can, of course, be omitted or used in smaller amounts when the copolymer has adequate tensile strength due to crystallization on stretching.

Other additives can be incorporated in the elastomer fiber formulation, either before or after compounding and before the fiber is spun, as for example, antioxidants, dyes, pigments, etc. The copolymer is preferably stabilized before the compounding step by adding an antioxidant. Any of the well known hindered phenolic antioxidants can be used. Amine antioxidants, while operable, are generally not preferred because of discoloration on aging. Peroxide decomposers, such as sulfides, disulfides, etc., as for example lauryl thiodipropionate, distearyl disulfide, polymeric sulfides and disulfides, etc., can also be incorporated. Frequently it is desirable to add an acid acceptor such as mono-, di- and polyepoxides as for example, phenyl glycidyl ether, the diglycidyl ether of Bisphenol A, etc., oxides of calcium, magnesium, zinc, lead, etc., carbonates of calcium, magnesium, lead, etc., and stearates, phthalates, etc., of calcium, magnesium, zinc, cadmium, lead, etc.

The step of mixing, or compounding, the filter, vulcanizing ingredients, and other additives with the copolymer should be carried out under conditions such that good dispersion of all of the ingredients is obtained. The exact means for carrying out the dispersion of the ingredients in the polymer will depend on the type of spinning process to be used, but in general, two-roll mills, kneader-type mixers, high shear agitators and the like are used. The dispersion process can also be utilized as a means of degrading very high molecular weight copolymers to a narrower molecular weight distribution copolymer, which then yields a fiber of improved strength properties. Obviously, such degradation should be carried out only on copolymers that have a higher initial molecular weight than is finally needed. Other means of obtaining narrow molecular weight distribution are, of course, appropriate control of the polymerization process or, alternatively, if the molecular weight is too high, by mechanical (shear) or chemical degradation, or by thermal cracking of the base polymer.

The elastomeric fiber is then produced by spinning the copolymer that has been compounded as described above. Preferably the fiber is wet spun into water from a solution of the compounded polymer in a water-miscible solvent such as acetone, dioxane, dimethyl formamide, dimethyl sulfoxide, etc. The wet fiber is dried and partially cross-linked by passing it through a heating zone, preferably through a hot gas such as air, nitrogen, or steam, or by passing it through a hot nonsolvent liquid, or by other appropriate means, and then winding it up on a bobbin. Cross-linking is then completed by further heating in an oven for an appropriate time and at an appropriate temperature. The time and temperature will, of course, depend upon the curing system used, but generally will be from fractions of a minute up to several hours at temperatures within the range of about 70° to 200° C. and preferably 90° to 160° C. Other spinning processes can also be used, as for example dry spinning. In the latter case, the lower boiling solvents used for wet spinning can be used, or water-immiscible solvents such as aromatic hydrocarbons, as for example benzene, toluene, xylene, etc., or chlorinated solvents, as for example methylene chloride, ethylene dichloride, etc., can be used. In fact, the copolymerization process can be carried out in a suitable solvent, such as dioxane, toluene, methylene chloride, etc., and the additives dispersed therein, and the spinning operation then carried out without the intermediate step of isolating the copolymer. The fibers can also be prepared by melt extrusion in the absence of added solvent. Another spinning process that can be used is that of preparing a latex of the polymer and other ingredients and spinning the fiber into a coagulating aqueous medium, such as is used for spinning conventional rubbers.

The copolymers used in the preparation of the elastomeric fibers of this invention have quite low solution viscosities for a given molecular weight which permits the use of spinning solutions of much higher solids contents and thus more economic operation than in the case of solvent spinning many polymers. It is frequently desirable to add to the spinning solution a chelating agent such as acetylacetone so as to solubilize any catalyst residue that may be present in the copolymer. This can, of course, be omitted if the catalyst is completely removed prior to the compounding step or if it is properly deactivated or solubilized at the end of the polymerization process.

The following examples illustrate the preparation of the epihalohydrin copolymers and the preparation of elastomeric fibers therefrom in accordance with this invention. All parts and percentages are by weight unless otherwise indicated. The molecular weight of the polymers is shown by their Reduced Specific Viscosity (RSV). By the term "Reduced Specific Viscosity" is meant the $\eta_{sp}/C$ determined on a 0.1% solution of the polymer in cyclohexanone containing 0.1 g. of the polymer per 100 ml. of solution, at 50° C. or as determined on a 0.1% solution of the polymer in α-chloronaphthalene containing 0.1 g. of the polymer per 100 ml. of solution, at 100° C. In cases where the catalyst has not been removed or only partially removed, the RSV can be measured by adding 3% of acetylacetone to the α-chloronaphthalene and obtain essentially the same value as if no catalyst residue were present.

*Example 1*

A stainless steel, stirred reactor was charged under a nitrogen atmosphere with 2900 parts of dry toluene, 100 parts of epichlorohydrin, 17 parts of n-heptane, 6.3 parts of ethylene oxide and 8.2 parts of allyl glycidyl ether. The temperature was increased to 130° C. and then, while stirring, 13.5 parts of the catalyst solution was added to start the polymerization. The catalyst solution used was that prepared by adding to a 0.5 M solution of triethylaluminum in 70:30 n-heptane-diethyl ether 0.5 mole of water per mole of triethylaluminum at 0° C. during 15 minutes, stirring the mixture at 0° C. for 1 hour, then adding 0.5 mole of acetylacetone per mole of aluminum and after stirring for 15 minutes at 0° C., stirring the mixture at room temperature for 20 hours. After the polymerization reaction had proceeded for 5 minutes, a monomer mixture prepared from 123 parts of epichlorohydrin, 56 parts of ethylene oxide and 20 parts of allyl glycidyl ether was fed into the reactor at such a rate that the initial concentration of all monomers was maintained, as determined by periodic gas chromatography analyses of the reaction mixture (using the n-heptane as an internal standard). At the same time, additional catalyst was also pumped in periodically to maintain a uniform polymerization rate. During the nine-hour reaction period at 130° C., there was added 115 parts of catalyst solution and 106 parts of the monomer mixture. The polymerization was stopped by adding anhydrous ethanol and the polymer was stabilized by adding to the reaction mixture about 1% each of the condensation product of crotonaldehyde with about 3 moles of 3-methyl-6-tert-butylphenol and of lauryl thiodipropionate, based on the polymer formed. The polymer was then recovered by allowing the solvent to evaporate off at room temperature, followed by further drying at 80° C. under vacuum. Analysis showed the copolymer to contain 54% epichlorohydrin, 37% ethylene oxide and 9% allyl glycidyl ether. It had a Mooney viscosity (ML-4, 212° F.) of 35 and an RSV of 1.7 as measured on a 0.1% solution in α-chloronaphthalene containing 3% acetylacetone at 100° C.

*Example 2*

Example 1 was repeated except that the polymerization was run for 10.6 hours and 159 parts of the monomer mixture was added during the run. The polymerization reaction was short-stopped by adding a solution containing 39 parts of toluene, 36 parts of anhydrous ethanol and 2.9 parts each of the two stabilizers used in that example. In this example, the polymer was isolated by precipitation from the reaction mixture by the addition of 1100 parts of commercial heptane containing 0.44 part and 1.3 parts, respectively, of the two stabilizers. The insoluble polymer was separated, washed twice with the precipitant solution and then was dried for 16 hours at room temperature under vacuum. There was obtained 74.5 parts of the copolymer, which on analysis was shown to contain 57% epichlorohydrin, 34% ethylene oxide, and 9% allyl glycidyl ether. It had a Mooney viscosity of 62 and an RSV of 2.2 as measured on a 0.1% solution in α-chloronaphthalene containing 3% of acetylacetone at 100° C.

*Example 3*

The procedure of Example 1 was repeated except that the initial monomer charged to the reactor was 282 parts of epichlorohydrin, 6.3 parts of ethylene oxide, and 18.2 parts of allyl glycidyl ether. The monomer mixture added during the polymerization was made up of 176.5 parts epichlorohydrin, 28 parts of ethylene oxide and 22.7 parts of allyl glycidyl ether, 180 parts of this mixture being added during the 11 hours of polymerization. The copolymer was isolated as described in Example 2. It had a Mooney viscosity of 47 and an RSV of 3.4 as measured on a 0.1% solution in α-chloronaphthalene containing 3% acetylacetone at 100° C. and analysis showed it to contain 72% epichlorohydrin, 19% ethylene oxide, and 9% allyl glycidyl ether.

The terpolymers produced in Examples 1–3 were compounded by mixing the following formulation on a two-roll mill for 12 minutes with the rolls at 100–125° F.:

| | Parts |
|---|---|
| Terpolymer | 100 |
| Reinforcing grade of fumed silica | 20 |
| Zinc stearate | 1.5 |
| Rutile grade $TiO_2$ | 3 |
| Zinc oxide | 5 |
| Tetramethyl thiuram disulfide | 1.5 |
| 2-mercaptobenzothiazole | 0.75 |
| Thiourea | 1 |
| Sulfur | 1.5 |

During the milling, the compound was cross-cut and end-rolled six times each. The compounded mixture was sheeted out, cooled and then dissolved in a solvent made up of 97.5% acetone and 2.5% acetylacetone. The solutions were spun through a 0.0135 inch diameter spinneret into a water coagulation bath and the resulting fibers were passed through hot air at 160° C. and collected on a bobbin. Curing was completed by heating the bobbins in a forced air oven at 140° C. Tabulated below are the spinning conditions and physical properties for the fibers so produced.

| | Ex. 1 | Ex. 2 | Ex. 3 |
|---|---|---|---|
| Terpolymer Composition ECH:EO:AGE | 54:37:9 | 57:34:9 | 72:19:9 |
| Spinning Conditions: | | | |
| Solution conc., Percent Solids | 25 | 37 | 24 |
| Feed rate, min./cc | 10 | 9.5 | 9 |
| Take-up rate, ft./min | 8 | 6 | 6.5 |
| Cure Time, Hrs | 2 | 2 | 1 |
| Physical Properties: | | | |
| Denier | 140 | 121 | 141 |
| Tensile strength, g./denier | 0.13 | 0.24 | 0.17 |
| Breaking elongation, percent | 900 | 900 | 900 |

*Example 4*

A polymerization vessel with a nitrogen atmosphere was charged with ether, 9 parts of epichlorohydrin and 1 part of allyl glycidyl ether. After equilibrating at 30° C., a solution of the catalyst was injected. The catalyst solution was prepared by diluting a solution of triethylaluminum in n-heptane to 0.5 molar with ether, adding water in an amount of 0.5 mole of water per mole of aluminum compound and agitating the solution at 30° C. for 16 hours. An amount of this catalyst solution equivalent to 0.45 part of the triethylaluminum was used. The total diluent amounted to 35 parts and contained 95% ether. The reaction mixture was agitated and held at 30° C. for 3 hours, after which the polymerization was stopped by adding 4 parts of anhydrous ethanol and the reaction mixture was diluted with 25 parts of ether. It was then washed twice with a 3% aqueous solution of hydrochloric acid, with water until neutral, then with a 2% aqueous sodium bicarbonate solution and finally with water. The ether-insoluble polymer was collected, washed with ether, then with ether containing 0.2% Santonox and dried. There was obtained a 9.5% conversion of a snappy rubberlike material having an RSV of 2.8 in cyclohexanone at 50° C. and was shown to be amorphous by X-ray. Based on chlorine analysis it contained 16.2% allyl glycidyl ether.

This copolymer was compounded as described in Examples 1–3 using the formulation

| | Parts |
|---|---|
| Copolymer | 100 |
| Reinforcing grade of fumed silica | 10 |
| Zinc stearate | 1.5 |
| Rutile grade $TiO_2$ | 3 |
| Zinc oxide | 5 |
| Bis pentamethylene thiuram disulfide | 5 |
| 2-mercaptobenzothiazole | 1.0 |
| Thiourea | 1 |

The compounded copolymer was dissolved and spun as described above except that after removing from the water bath, they were passed through a hot air zone at 160° C. for 2 minutes to give some prevulcanization and then were collected on a bobbin and cured for 30 minutes at 150° C. The fiber so obtained was strong and rubbery, with excellent recovery characteristics.

*Example 5*

A polymerization vessel in which the air had been replaced with nitrogen was charged with 40 parts of toluene, 7 parts of epichlorohydrin, 1 part of ethylene oxide and 2 parts of butadiene monoxide. After equilibrating at 30° C., a solution of the catalyst was injected. The catalyst solution was prepared by reacting a 0.5 M solution of triethylaluminum in 70:30 n-heptane:diethyl ether with 0.5 mole of acetylacetone per mole of aluminum and then with 0.5 mole of water per mole of aluminum compound. An amount of this catalyst solution equivalent to 0.23 part of the triethylaluminum was then injected in the polymerization mixture. After 27 hours at 30° C., the polymerization was stopped. The ether-insoluble copolymer was precipitated by adding 1–2 volumes of 1% methanolic hydrogen chloride, and was separated by filtration, washed with methanol until neutral and then with a 0.2% solution of Santonox, i.e., 4,4'-thiobis (6-tert-butyl-m-cresol), in methanol and finally was dried for 16 hours at 50° C. under vacuum. The ether-insoluble polymer so isolated amounted to a 12% conversion based on the total monomers charged and had an RSV of 5.0 in α-chloronaphthalene at 100° C. It was amorphous by X-ray and analysis showed it to contain 50% epichlorohydrin, 30% ethylene oxide and 20% butadiene monoxide.

A fiber was prepared from this copolymer by the procedure described in Examples 1–3. It was a strong, rubbery, solvent resistant fiber having a tensile strength of 0.2 g. per denier and a breaking elongation of 1000%.

*Example 6*

A polymerization vessel with a nitrogen atmosphere was charged with 318 parts of dry toluene, 4.0 parts of the glycidyl ester of tall oil fatty acids (60% linoleic acid, 31% oleic acid and 9% of saturated $C_{16}$ to $C_{20}$ fatty acids), 4.0 pars of ethylene oxide and 32.0 parts of epichlorohydrin. With the vessel and contents equilibrated at 30° C., there was added an amount of a 0.5 molar solution of the catalyst described in Example 1 equal to 1.80 parts of triethylaluminum. After 19 hours at 30° C., the polymerization reaction was shortstopped by adding 16 parts of anhydrous ethanol containing 0.05 part of a stabilizer which was the condensation product of crotonaldehyde with about 3 moles of 3-methyl-6-tert-butylphenol. The polymer was precipitated by adding 300 parts of a commercial heptane mixture containing 0.04% of the same stabilizer used above. The supernatant was decanted off; the polymer was agitated with 300 parts more of the precipitant, the supernatant decanted and again repeating this wash procedure. The polymer was then separated by filtration and dried for 16 hours at 80° C. under vacuum. It amounted to 6.1 parts (15.2% conversion) and was a rubbery solid having an RSV of 3.7 as measured on a 0.1% solution in α-chloronaphthalene containing 3% acetylacetone at 100°

C. Based on chlorine and bromine-number analysis, the copolymer contained 53% epichlorohydrin, 36% ethylene oxide, and 11% of the glycidyl ester. It was amorphous by X-ray.

A fiber was prepared from this terpolymer by the procedure described in Example 4 except that 20 parts of the reinforcing silica was used in the compounding formulation. The fiber so produced was a strong, rubbery fiber.

The foregoing examples have illustrated the preparation of the elastomeric fibers of this invention. As will be readily appreciated, these fibers have excellent strength properties. In addition, these fibers are superior to the previously known elastomeric fibers made, for example, from natural rubber, neoprene, and nitrile rubbers in one or more properties as, for example, they have improved solvent resistance, heat and light stability, and chemical resistance, such as resistance to ozone, bleaching agents, etc. Because of these improved properties, blends can be made of these elastomeric fibers with conventional textile fibers for fabrics which are dry-cleaned and which must have long-term stability. Such blends make it possible to produce garments which are more comfortable, require less sizes, are better form-fitting, and wear longer.

Another advantage of the elastomeric fibers of this invention is that the halogen atoms present in the base polymer are reactive and thus provide a site for chemically attaching dyes, dyeing sites, surface coatings, antioxidants, etc. This makes it possible to permanently attach such agents, as for example, by using dyes or other additives that contain reactive amine groups, and make them completely resistant to extraction during water-washing, dry-cleaning, etc.

What I claim and desire to protect by Letters Patent is:

1. An elastomeric fiber comprising a cross-linked copolymer of an epihalohydrin and at least one other epoxide, at least one of which said other epoxide is ethylenically unsaturated epoxide; said copolymer being a solid, amorphous copolymer having a reduced specific viscosity of at least about 0.5 when measured as a 0.1% solution in α-chloronaphthalene at 100° C., said copolymer being esssentially a linear polyether containing at least about 20% by weight of repeating units derived from epihalohydrin and at least about 0.5% by weight of repeating units derived from said ethylenically unsaturated epoxide, said copolymer having been cross-linked with a sulfur-curing agent in the absence of an amine.

2. An elastomeric fiber in accordance with claim 1 wherein the copolymer contains at least about 30% by weight of repeating units derived from epihalohydrin and at least about 2% by weight of repeating units derived from said ethylenically unsaturated epoxide.

3. An elastomeric fiber in accordance with claim 1 wherein the ethylenically unsaturated epoxide is a glycidyl ether having the formula

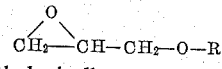

where R is an ethylenically unsaturated group.

4. An elastomeric fiber in accordance with claim 1 wherein the ethylenically unsaturated epoxide is a monoepoxide of a polyene.

5. An elastomeric fiber in accordance with claim 1 wherein the ethylenically unsaturated epoxide is a glycidyl ester having the formula

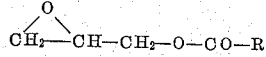

where R is an ethylenically unsaturated hydrocarbon group.

6. An elastomeric fiber in accordance with claim 3 wherein the repeating units are derived from epichlorohydrin and allyl glycidyl ether.

7. An elastomeric fiber in accordance with claim 3 wherein the repeating units are derived from epichlorohydrin, ethylene oxide and allyl glycidyl ether.

8. An elastomeric fiber in accordance with claim 4 wherein the repating units are derived from epichlorohydrin, ethylene oxide and butadiene monoxide.

9. An elastomeric fiber in accordance with claim 5 wherein the repeating units are derived from epichlorohydrin, ethylene oxide and the glycidyl ester of tall oil fatty acids.

References Cited by the Examiner
UNITED STATES PATENTS

| | | | |
|---|---|---|---|
| 2,476,922 | 7/1949 | Shokal | 260—78.4 |
| 2,995,779 | 3/1959 | Winter | 264—210 |
| 3,026,270 | 3/1962 | Robinson | 260—2 |
| 3,026,305 | 3/1962 | Robinson | 260—2 |
| 3,030,173 | 4/1962 | Kurzke et al. | 264—210 |
| 3,031,439 | 4/1962 | Bailey | 260—88.3 |
| 3,158,591 | 11/1964 | Vandenberg | 260—88.3 |
| 3,168,488 | 2/1965 | Sommer | 260—18 |
| 3,170,887 | 2/1965 | Ramos | 260—18 |

FOREIGN PATENTS
226,554  4/1959  Australia.

LEON J. BERCOVITZ, *Primary Examiner.*

C. W. IVY, *Assistant Examiner.*